(12) United States Patent
Okumura et al.

(10) Patent No.: US 6,584,050 B1
(45) Date of Patent: Jun. 24, 2003

(54) OPTICAL RECORDING DEVICE, OPTICAL REPRODUCING DEVICE, AND OPTICAL MEMORY MEDIUM

(75) Inventors: Tetsuya Okumura, Neyagawa (JP); Shigemi Maeda, Yamatokoriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/559,898

(22) Filed: Apr. 26, 2000

(30) Foreign Application Priority Data

Apr. 26, 1999 (JP) .......................................... 11-117489

(51) Int. Cl.⁷ ................................................ G11B 7/00
(52) U.S. Cl. ..................... 369/47.5; 369/116; 369/59.11
(58) Field of Search ............................ 369/47.28, 47.5, 369/59.21, 59.25, 59.2, 59.11, 47.53, 116

(56) References Cited

U.S. PATENT DOCUMENTS

| | | | | |
|---|---|---|---|---|
| 5,572,502 A | * | 11/1996 | Naruse et al. | ............... 369/116 |
| 5,617,400 A | * | 4/1997 | Fuji | ........................ 369/47.5 |
| 5,978,335 A | * | 11/1999 | Clark et al. | ............... 369/53.34 |
| 6,222,814 B1 | * | 4/2001 | Ichimura | ................... 369/116 |
| 6,416,929 B2 | * | 7/2002 | Fukano et al. | ............. 369/284 |

FOREIGN PATENT DOCUMENTS

| | | |
|---|---|---|
| JP | 11-7668 | 1/1999 |
| JP | 11-16221 | 1/1999 |
| JP | 11-39739 | 2/1999 |
| JP | 11-110843 | 4/1999 |

* cited by examiner

*Primary Examiner*—Thang V. Tran
*Assistant Examiner*—Bach Vuong
(74) *Attorney, Agent, or Firm*—Edwards & Angell, LLP; David G. Conlin; David A. Tucker

(57) ABSTRACT

A recording-reproducing device includes a power control pattern generating circuit for generating a power control pattern to be used for control of a reproducing power of a semiconductor laser, a phase adjusting pattern generating circuit for adjusting a phase of a reproducing clock to be used upon reproduction of the power control pattern, a synchronous pattern generating circuit for generating a synchronous pattern to be recorded immediately before the phase adjusting pattern, and a recording data selecting circuit. The recording data selecting circuit consecutively selects an output of the phase adjusting pattern generating circuit, an output of the synchronous pattern generating circuit, and an output of the power control pattern generating circuit, and records these outputs in a front part of each sector of a magneto-optical disk.

12 Claims, 8 Drawing Sheets

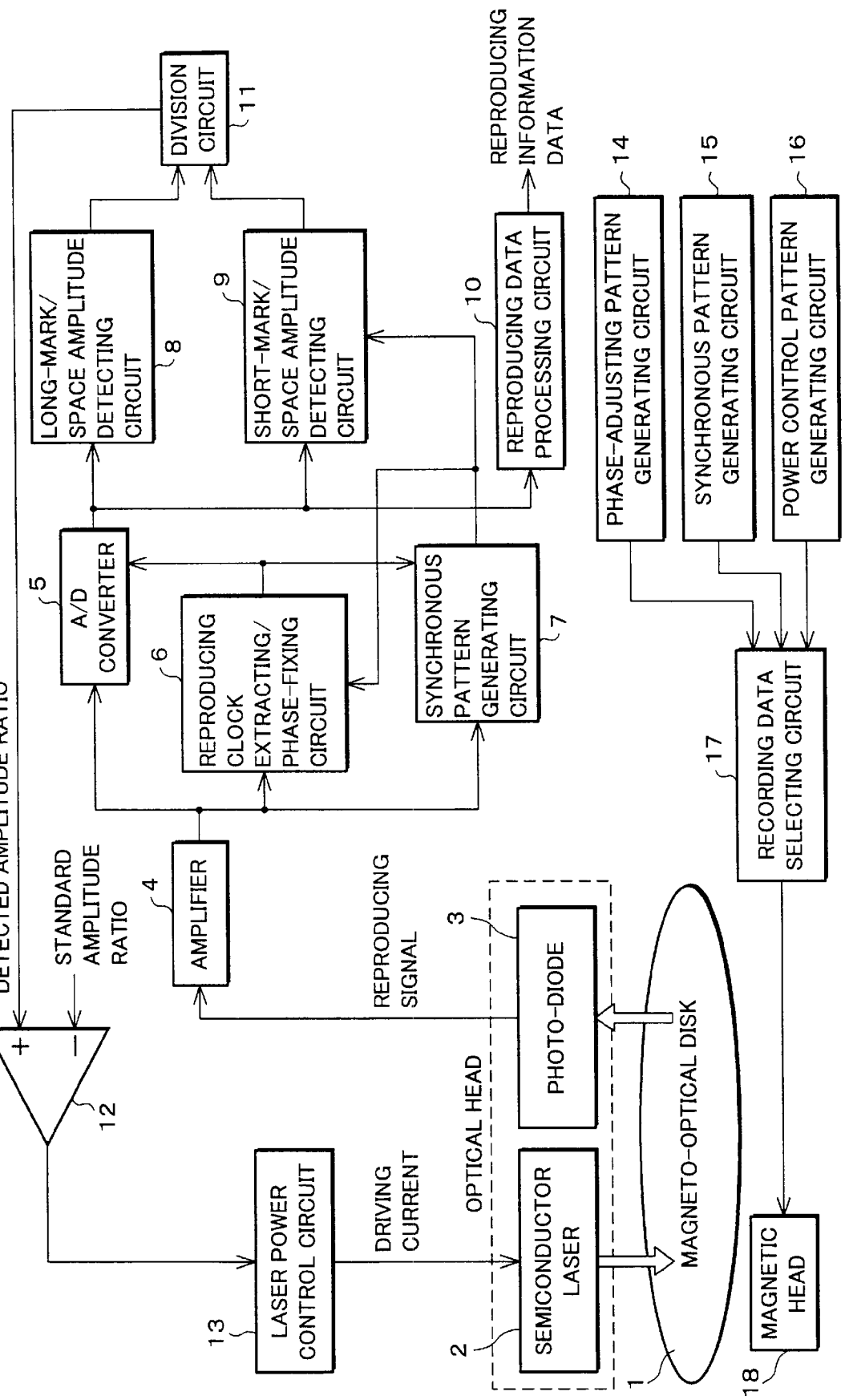
F I G. 1

PHASE-ADJUSTING PATTERN

SYNCHRONOUS PATTERN

SHORT-MARK/SPACE PATTERN

LONG-MARK SPACE PATTERN (a) PHASE-ADJUSTING PATTERN (b) REPRODUCING WAVE-FORM      O LEVEL (c) BINARIZED SIGNAL (d) EXTRACTED CLOCK (e) SHORT-MARK/SPACE PATTERN (f) A/D CONVERSION SAMPLING      AMPLITUDE VALUE

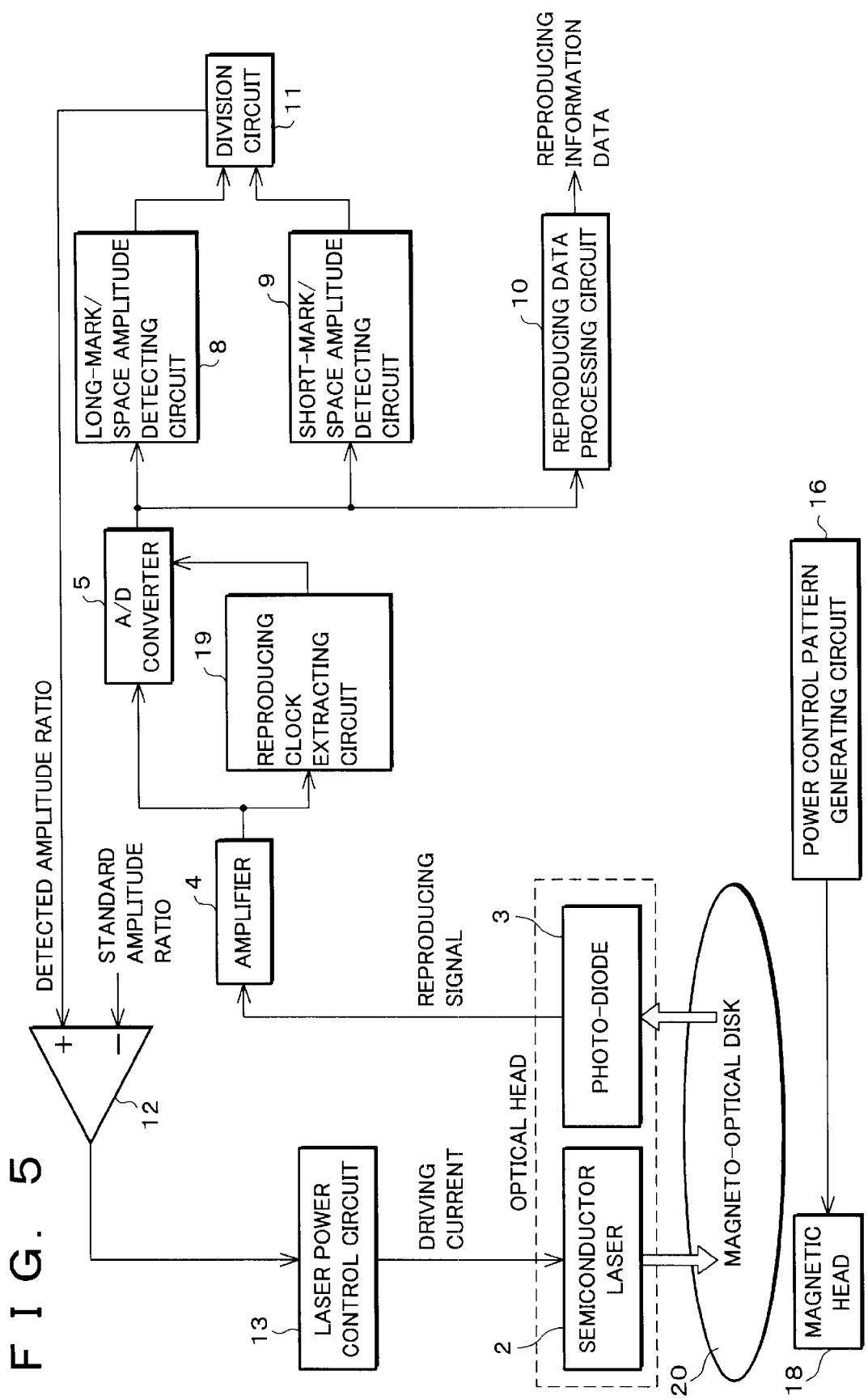
F I G. 5

SHORT-MARK/SPACE PATTERN

LONG-MARK SPACE PATTERN (a) SHORT-MARK/SPACE PATTERN (b) REPRODUCING WAVE-FORM (BEFORE REMOVING LOW FREQUENCY COMPONENT)       O LEVEL (c) BINARIZED SIGNAL (d) EXTRACTED CLOCK (e) SAMPLING POINT (f) REPRODUCING WAVE-FORM (AFTER REMOVING LOW FREQUENCY COMPONENT)        O LEVEL (g) BINARIZED SIGNAL (h) EXTRACTED CLOCK (i) SAMPLING POINT

OPTICAL RECORDING DEVICE, OPTICAL REPRODUCING DEVICE, AND OPTICAL MEMORY MEDIUM

FIELD OF THE INVENTION

The present invention relates to an optical recording device, an optical reproducing device, and an optical memory medium that are arranged so that a control pattern is recorded in the optical memory medium of a magnetic super-resolution type, and that a reproducing power of a light beam is controlled according to a reproducing signal obtained from the control pattern.

BACKGROUND OF THE INVENTION

Recently, magneto-optical disks of the magnetic super-resolution type from which recording marks smaller than a spot diameter of a light beam can be reproduced have drawn attention. Such a magneto-optical disk is, for instance, provided with a recording layer and with a reproducing layer having in-plane magnetization at room temperature, and reproduction of the same is carried out in the following manner. During reproducing, a light beam is projected onto the reproducing layer side of the magneto-optical disk. Then, part of the area of the reproducing layer within the light beam spot is heated to above a predetermined temperature, and the magnetization of this portion (hereinafter referred to as an aperture) shifts from in-plane magnetization to a perpendicular magnetization conforming to that of the recording layer beneath the aperture. In this way, recorded marks smaller in diameter than the light beam spot can be reproduced.

By the foregoing method, however, changes in the ambient temperature during reproducing tend to cause the optimum reproducing power of the light beam to fluctuate accordingly, even in the case where the driving current for generating the light beam is kept constant.

If reproducing power is much stronger than the optimum level, the aperture formed becomes too large. Consequently, output of reproducing signals from tracks adjacent to the track being reproduced is increased, the proportion of noise signals included in the reproduced data increases, and reading errors are more likely to occur. If reproducing power is much weaker than the optimum level, the aperture becomes smaller than the recorded mark, and the reproducing signal output from the target track is reduced. Accordingly, the proportion of noise signals included in the main signal increases, and reading errors are more likely to occur in this case as well.

A technique to cope with the foregoing problem is disclosed in the Japanese Publication for Laid-Open Patent Application No. 7668/1999 (Tokukaihei 11-7668 [publication date: Jan. 12, 1999]). In that technique, two types of patterns for reproducing power control (hereinafter referred to as reproducing-power-control patterns) of different mark-space lengths are reproduced, and reproducing power is controlled so as to bring close to a predetermined value a ratio of amplitudes of reproducing signals obtained from these recorded marks. By this means, reproducing power is maintained at an optimum value, and the likelihood of reading errors is reduced. Here, in the case where the shorter pattern among the two types of reproducing-power-control patterns has a recording length of 1T (T represents the minimum recording length), the S/N ratio becomes too low since a signal from the pattern has a small amplitude value. On the other hand, in the case where the foregoing pattern has a recording length of 2T, sensitivity to changes in the amplitude ratio cannot be obtained at the level required for detection of an optimum aperture since a signal from the pattern has a great amplitude value. Therefore, the technique disclosed by the foregoing publication utilizes 1T- and 2T-patterns that are present together.

FIG. 5 is a block diagram schematically illustrating an arrangement of such a recording-reproducing device. FIG. 6 is a view schematically illustrating a structure of a magneto-optical disk 20 used in the foregoing recording-reproducing device. FIG. 7 is an explanatory view of short-mark/space patterns and long-mark/space patterns for reproducing power control. The following description will explain the foregoing recording-reproducing device, particularly its reproducing power control operation, with reference to these figures.

As shown in FIG. 6, in a magneto-optical disk 20, data are recorded in each sector 200 as a unit. A short-mark/space recording area 103 is provided in a front part of each sector 200, and a long-mark/space recording area 104 is provided therebehind. Furthermore, a data recording area 105 for recording information data is provided behind the long-mark/space recording area 104.

As shown in FIG. 7(a), a short mark having a mark length of 2T is repeatedly provided at an inter-mark distance (space) of 1T in the short-mark/space recording area 103. As shown in FIG. 7(b), a long mark having a mark length of 8T is repeatedly provided at an inter-mark distance (space) of 8T in the long-mark/space recording area 104.

The following description will explain an operation of recording reproducing-power-control patterns in a magneto-optical disk 20 arranged as described above.

A light emitted from a semiconductor laser 2 is projected onto the short-mark/space recording area 103 disposed in the front part of the sector 200 on the magneto-optical disk 20. Here, a driving current supplied to the semiconductor laser 2 from the laser power control circuit 13 has a high power for recording use.

Besides, simultaneously, an external magnetic field is applied onto the magneto-optical disk 20 from a magnetic head 18. Here, a power control pattern generating circuit 16 switches the polarity of the magnetic head 18 at time intervals of 1T and 2T.

In so doing, the short marks having a mark length of 2T each are recorded at inter-mark distances of 1T each in the short-mark/space area 103 as shown in FIG. 7(a). Likewise, the power control pattern generating circuit 16 switches the polarity of the magnetic head 18 at time intervals of 8T, thereby causing the long marks having a mark length of 8T each to be recorded at inter-mark distances of 8T each in the long-mark/space area 104 as shown in FIG. 7(b).

The following description will explain a reproducing operation of the foregoing recording-reproducing device. Upon projection of light emitted from the semiconductor laser 2 onto the short-mark/space recording area 103 in the sector 200 on the magneto-optical disk 20, light is reflected from the short-mark/space pattern recorded in the area. This reflected light is converted by a photo-diode 3 into a reproducing signal. The reproducing signal is sent to an amplifier 4 where the reproducing signal is amplified to a level in a range suitable for input into an A/D converter 5 after low-frequency components are removed from the reproducing signal. The reproducing signal is subsequently subjected to A/D conversion by the A/D converter 5, and further, it is inputted to the short-mark/space amplitude detecting circuit 9 where an amplitude value of the short-mark/space pattern is determined. Likewise, reflected light from the long-mark/space recording area 104 is processed by means of the photo-diode 3, the amplifier 4, the A/D converter 5, and the long-mark/space amplitude detecting circuit 8, so that an amplitude value of the long-mark/space pattern is determined.

Incidentally, the A/D conversion is carried out at timings by clocks extracted from the respective reproducing signals by a reproducing clock extracting circuit 19. The short-mark/space pattern and long-mark/space pattern thus determined are inputted into a division circuit 11 and an amplitude ratio thereof is outputted therefrom. This detected amplitude ratio and a standard amplitude ratio are compared by a differential amplifier 12. The driving current applied to the semiconductor laser 2 is controlled by a laser power control circuit 13 so that feedback causes the difference as a result of the foregoing comparison to become smaller.

After the laser light driving current is controlled so that an optimum reproducing power is applied, the emitted light is projected onto the data recording area 105, and reflected light therefrom is inputted to the photo-diode 3, the amplifier 4, the A/D converter 5, and the reproducing data processing circuit 10. Consequently, reproduced information data are outputted at a lower error rate. Then, when the reflected light reaches the next sector, the same process is repeated, so that the reproducing power is set to a new optimum level.

As described above, the conventional recording-reproducing device is arranged as follows: the area for recording the marks for reproducing power control is provided in each sector, that is, dispersedly on the whole, so that the quantity of the reproducing signal for reproducing power control is detected at each sector. This enables control of the reproducing power to respond within a short time to rapid fluctuations in the optimum reproducing power.

However, the foregoing conventional recording-reproducing device have problems as described below.

[PROBLEM 1]

A/D conversion in the conventional recording-reproducing device is, as described above, carried out at timings by the clocks extracted from the reproducing signals by the reproducing clock extracting circuit 19. Therefore, in the case where the frequency and phase of the clock thus extracted shift from normal values, an amplitude value detected of the short-mark/space also shifts from a true value. Consequently, the reproducing power of the light beam controlled according to the foregoing detected values become abnormal. This results in, far from reproduction with a low error rate, deletion of recorded data, and what is worse, damage to the semiconductor laser.

[PROBLEM 2]

FIGS. 8(*a*) through 8(*i*) are explanatory views illustrating the clock extracted from the reproducing signal of the short-mark/space pattern in the case of the conventional arrangement. When the short-mark/space pattern in which short marks having a mark length of 2T each are formed at inter-mark distances of 1T each as shown in FIG. 8(*a*) is reproduced, a reproducing wave-form as shown in FIG. 8(*b*) is obtained. By binarizing the wave-form at the 0 level, a binary signal with edges corresponding to the mark ends as shown in FIG. 8(*c*) can be obtained. Accordingly, a clock having phases corresponding to the edges as shown in FIG. 8(*d*) can be extracted. By carrying out the sampling for the A/D conversion at timings by the rise of this clock, the reproducing wave-form can be sampled at optimal phases as shown with ○ in FIG. 8(*e*).

In the short-mark/space pattern, however, the marks and the spaces are different in length, and therefore, the resulting reproducing signal contains low-frequency components. The low-frequency components are removed when the reproducing signal passes through the amplifier 4. This removal of low-frequency components is realized by a high-pass filter (HPF) in the amplifier 4, that operates with a certain time lag, though the level of the time lag varies with the time constant (constant representing the responsiveness).

Therefore, upon reproduction of the front part of the short-mark/space recording area 103, as described above, the adequate clock can be extracted. However, as the low-frequency components are lost, the reproducing wave-form shifts so as to become vertically symmetric with respect to the 0 level as shown in FIG. 8(*f*) Therefore, in the case where the reproducing wave-form is sampled at rising timings of the clock shown in FIG. 8(*h*) whose edges have phases corresponding to the edges of the binary signal shown in FIG. 8(*g*). Consequently, as shown in FIG. 8(*i*), the wave-form is sampled at a phase with a shift of ¼ clock from the optimal phase.

This results in that a detected amplitude value of the short-mark/space greatly shifts from a true amplitude value, and the reproducing power of the light beam controlled based on the detected amplitude value also has an abnormal level. This results in, far from reproduction with a low error rate, deletion of recorded data, and what is worse, damage to the semiconductor laser.

SUMMARY OF THE INVENTION

The object of the present invention is to provide an optical recording device, an optical reproducing device, and an optical memory medium for use with the same that allow an appropriate amplitude value to be determined by reproducing a reproducing power control pattern according to a clock having stable phases.

An optical recording device of the present invention is an optical recording device that records information in an optical memory medium, and to achieve the foregoing object, the device is characterized by including (1) first pattern generating means for generating a signal corresponding to a power control pattern for control of a reproducing power of a light beam, (2) second pattern generating means for generating a signal corresponding to a phase adjusting pattern for adjusting a phase of a reproducing clock to be used upon reproduction of the power control pattern, and (3) pattern recording means for recording the phase adjusting pattern and the power control pattern in the stated order in each sector of the optical memory medium by switching between an output of the first pattern generating means and an output of the second pattern generating means.

According to the foregoing arrangement, the phase adjusting pattern is recorded in each sector. Therefore, a reproducing signal from the short-mark/space pattern recorded behind the phase adjusting pattern is sampled according to the clock whose phases are precisely adjusted, so that an amplitude value of the reproducing signal can be determined. Consequently, the reproducing power control can be stably carried out at any time.

An optical reproducing device of the present invention is an optical reproducing device for reproducing an optical memory medium in which recorded are a power control pattern for controlling a reproducing power of a light beam and a phase adjusting pattern for adjusting a phase of a reproducing clock to be used upon reproduction of the power control pattern, and to achieve the foregoing object, the device is characterized by including (1) phase adjusting means for adjusting the phase of the reproducing clock according to the phase adjusting pattern, (2) A/D converting means for, at the timing of the output of the phase adjusting means, carrying out A/D conversion of a reproducing signal of the power control pattern, (3) amplitude detecting means for, from an output of the A/D converting means, detecting an amplitude value of the reproducing signal of the power control pattern, and (4) power control means for controlling a reproducing power according to the amplitude detected by the amplitude detecting means.

According to the foregoing arrangement, the phases of the reproducing clock are adjusted by means of the recorded phase adjusting pattern. Therefore, a reproducing signal from the short-mark/space pattern is sampled according to the stable phases at any time, so that an amplitude value thereof can be determined. Consequently, the reproducing power control can be stably carried out.

Furthermore, an optical memory medium of the present invention is, to achieve the foregoing object, characterized by having sectors each of which includes (1) a power control pattern recording area for recording a power control pattern for controlling a reproducing power of a light beams, and (2) a phase adjusting pattern recording area for recording a phase adjusting pattern for adjusting a phase of a reproducing clock to be used upon reproduction of the power control pattern, the phase adjusting pattern recording area being provided before the power control pattern recording area.

According to the foregoing arrangement, the phase adjusting pattern is recorded in each sector. Therefore, a reproducing signal from the short-mark/space pattern recorded behind the phase adjusting pattern is sampled according to the clock whose phases are precisely adjusted, so that an amplitude value of the reproducing signal can be determined. Consequently, the reproducing power control can be stably carried out at any time.

According to the foregoing arrangements of the optical recording device, the optical reproducing device, and the optical memory medium of the present invention, the phase adjusting pattern whose mark and space are equal to each other in length and the power control pattern whose mark and space differ in length are recorded in each sector. With this arrangement, it is possible to determine an amplitude value of the power control pattern according to the clock having stable phases during reproducing. Consequently, information data can be reproduced with a precise and optimum reproducing power at any time.

Furthermore, with the synchronous pattern that is different from both the phase adjusting pattern and the power control pattern and that is recorded immediately before the power control pattern, the sampling of the power control pattern can be started in response to detection of the synchronous pattern during reproducing. This enables to surely detect an amplitude value of the power control pattern.

Furthermore, by recording the phase adjusting pattern and the power control pattern in a front part (header) of each sector, stable adjustment of the phases of the reproducing clock and stable reading of an amplitude from the power control pattern can be realized.

For a fuller understanding of the nature and advantages of the invention, reference should be made to the ensuing detailed description taken in conjunction with the accompanying drawings.

BRIEF DESCRIPTION OF THE DRAWINGS

FIG. 1 is a view schematically illustrating an arrangement of a magneto-optical disk recording/reproducing device in accordance with an embodiment of the present invention.

FIG. 5 is a view schematically illustrating an arrangement of a conventional magneto-optical disk recording-reproducing device.

DESCRIPTION OF THE PREFERRED EMBODIMENTS

The following description will explain an embodiment of the present invention while referring to FIGS. 1 through 4.

The following description will be given by way of example with reference to, as an optical memory medium, a magneto-optical memory medium of a magnetic super-resolution type that is provided with a recording layer and with a reproducing layer having in-plane magnetization at room temperature, and is subjected to an information reproducing operation in the following manner: during reproducing information, a light beam is projected onto the reproducing layer side of the magneto-optical disk, then, part of the area of the reproducing layer within the light beam spot is heated to above a predetermined temperature, and the magnetization of this portion (hereinafter referred to as an aperture) shifts from in-plane magnetization to a perpendicular magnetization conforming to that of the recording layer beneath the aperture, i.e., the magnetization of the recording layer is copied to the reproducing layer. The optical recording device, optical reproducing device, and optical memory medium of the present invention are, however, not limited to those for the magneto-optical memory medium of the magnetic super-resolution type of the present embodiment, and the medium itself, respectively.

Figure 2:
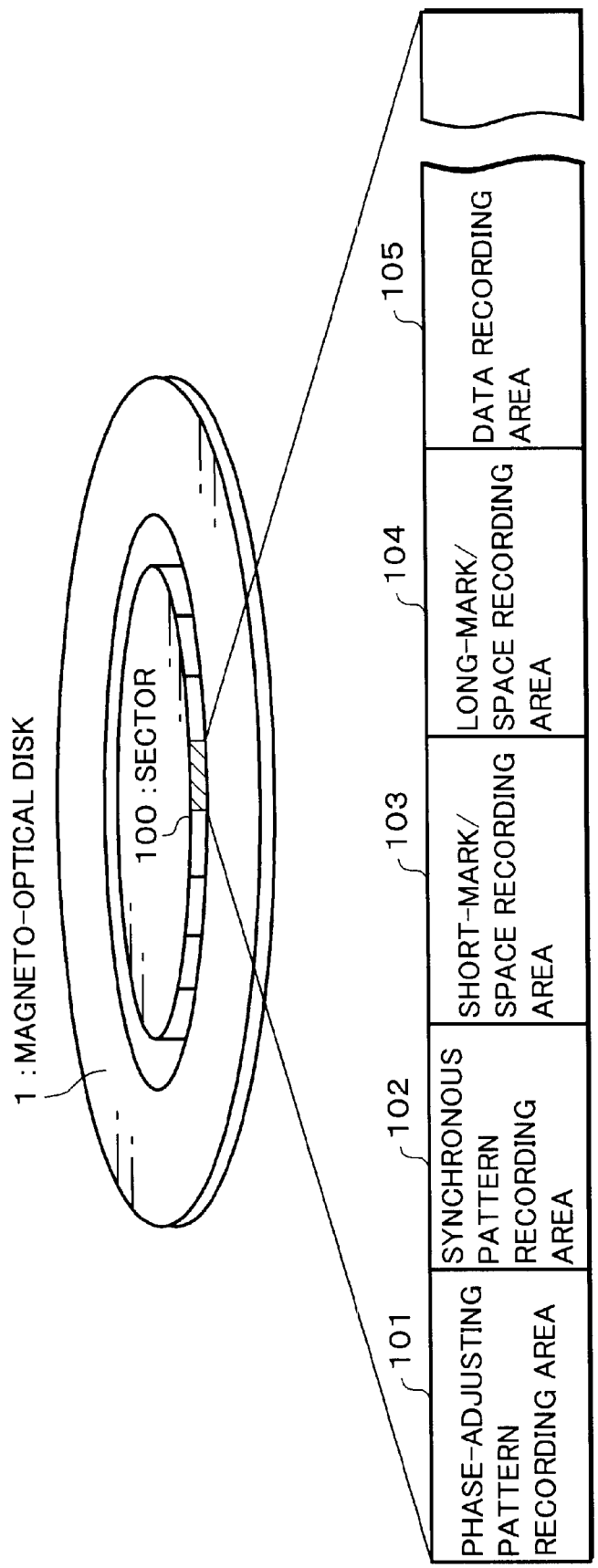
FIG. 2 is a diagram illustrating a sector arrangement of a magneto-optical disk shown in FIG. 1.

FIG. 1 is a view schematically illustrating an arrangement of a recording-reproducing device of the present embodiment, and FIG. 2 is a view schematically illustrating a configuration of a magneto-optical disk 1 shown in FIG. 1.

First of all, the magneto-optical disk 1 of the present embodiment is explained. As shown in FIG. 2, the short-mark/space recording area 103 and the long-mark/space recording area 104 are provided as a header in a front part of the sector 100, that is, before the data recording area 105, as is the case with the conventional typical magneto-optical disk 20. In the magneto-optical disk 1 of the present embodiment, a phase adjusting pattern recording area 101 and a synchronous pattern recording area 102 are provided immediately before the short-mark/space recording area 103.

The patterns recorded in the respective areas of the sector 100 shown in FIG. 2 are explained, with reference to FIGS. 3(a) through 3(d).

Figure 3A:
FIG. 3(a) is an explanatory view illustrating a phase adjusting pattern recorded in the phase adjusting pattern recording area in the sector shown in FIG. 2.
Figure 3B:
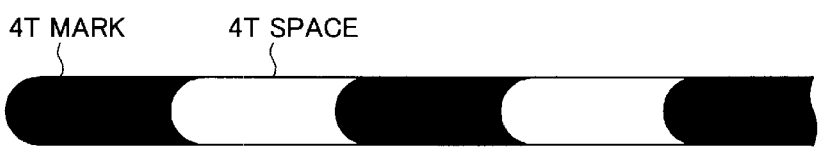
FIG. 3(b) is an explanatory view illustrating a synchronous pattern recorded in the synchronous pattern recording area in the sector shown in FIG. 2.
Figure 3C:
FIG. 3(c) is an explanatory view illustrating a short-mark/space pattern recorded in the short-mark/space pattern recording area in the sector shown in FIG. 2.
Figure 3D:
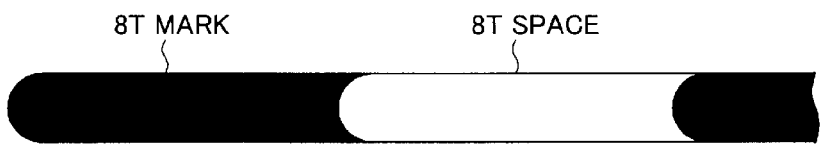
FIG. 3(d) is an explanatory view illustrating a long-mark/space pattern recorded in the long-mark/space recording area in the sector shown in FIG. 2.

In the phase adjusting pattern recording area 101, a mark having the same length as that of the inter-mark distance is repeatedly recorded as shown in FIG. 3(a). More specifically, a mark having a mark length of 2T is repeatedly recorded at an inter-mark distance (space) of 2T. In the synchronous pattern recording area 102, a pattern indicating a starting position of the short-mark/space pattern is recorded, as shown in FIG. 3(b). More specifically, a pattern composed of 4T-long mark and 4T-long space is recorded therein. In the short-mark/space recording area 103, a short mark is repeatedly recorded at an inter-mark space with a length different from that of the short mark, as shown in FIG. 3(c). More specifically, a short mark having a mark length of 2T is repeatedly recorded at an inter-mark space of 1T. In the long-mark/space recording area 104, a pattern composed of a long mark and a long space is repeatedly recorded, as shown in FIG. 3(d). More specifically, a long mark having a mark length of 8T is repeatedly recorded at an inter-mark distance of 8T.

FIG. 1 is a block diagram schematically illustrating an arrangement of a recording-reproducing device for recording/reproducing information with respect to the magneto-optical disk 1 arranged as described above. The following description will explain an operation of recording/reproducing to the magneto-optical disk 1 shown in FIGS. 1 and 2 by means of the recording-reproducing device shown in FIG. 1. Note that the members having the same functions as those in the conventional recording-reproducing device shown in FIG. 5 will be designated by the same reference numerals and their description will be omitted.

As shown in FIG. 1, the recording-reproducing device in accordance with the present embodiment is provided with a semiconductor laser 2, a photo-diode 3, an amplifier 4, an A/D converter 5, a long-mark/space amplitude detecting circuit 8, a short-mark/space amplitude detecting circuit 9, a reproducing data processing circuit 10, a division circuit 11, a differential amplifier 12, a laser power control circuit 13, a power control pattern generating circuit 16, and a magnetic head 18. The recording-reproducing device of the present embodiment further includes a synchronous pattern detecting circuit 7, a phase adjusting pattern generating circuit 14, a synchronous pattern generating circuit 15, and a recording data selecting circuit 17, to be added to the foregoing conventional arrangement. Moreover, the recording-reproducing device of the present embodiment further includes a reproducing clock extracting/phase-fixing circuit 6 in the place of the reproducing clock extracting circuit 19 in the foregoing conventional arrangement. The reproducing clock extracting/phase-fixing circuit 6 executes clock phase adjustment by utilizing only a reproducing signal of a phase adjusting pattern, and executes phase fixing in the case where a pattern other than the phase adjusting pattern is reproduced.

The following description will explain an operation of recording a reproducing power control pattern by means of the foregoing recording-reproducing device.

First of all, light emitted from the semiconductor laser 2 is made to reach the phase adjusting pattern recording region 101 in the sector 100 on the magneto-optical disk 1. The emitted light power of the semiconductor laser 2 is set to a level of a recording-use high power by means of the laser power control circuit 13. At the same time, a signal having 2T-long time intervals generated by the phase adjusting pattern generating circuit 14 is selected by means of the recording data selecting circuit 17, so that the polarity of the magnetic head 18 is switched at timings by the selected signal. By so doing, a phase adjusting pattern in which a mark having a mark length of 2T is repeatedly recorded at an inter-mark distance of 2T as shown in FIG. 3(a) is recorded.

Subsequently, when the emitted light from the semiconductor laser 2 reaches the synchronous pattern recording area 102, the recording data selecting circuit 17 selects a signal having 4T-long time intervals generated by the synchronous pattern generating circuit 15, so as to switch the polarity of the magnetic heat 18 at timings by the foregoing selected signal. By so doing, a synchronous pattern composed of a pair of 4T-long mark and 4T-long space as shown in FIG. 3(b) is recorded in the synchronous pattern recording area 102.

Further, when the emitted light from the semiconductor laser 2 reaches the reproducing power control pattern recording area (the short-mark/space recording area 103 and the long-mark/space recording area 104), the recording data selecting circuit 17 selects an output of the power control pattern generating circuit 16, so as to switch the polarity of the magnetic head 18 according to the foregoing selected output. By so doing, the short-mark/space patterns each being composed of the 2T-long mark and the 1T-long space as shown in FIG. 3(c) are recorded in the short-mark/space recording area 103, and the long-mark/space patterns each being composed of the 4T-long mark and the 4T-long space as shown in FIG. 3(d) are recorded in the long-mark/space recording area 104. Incidentally, in the data recording area 105, information is recorded by inversion of the magnetic head 18 in accordance with information data.

Figure 4:
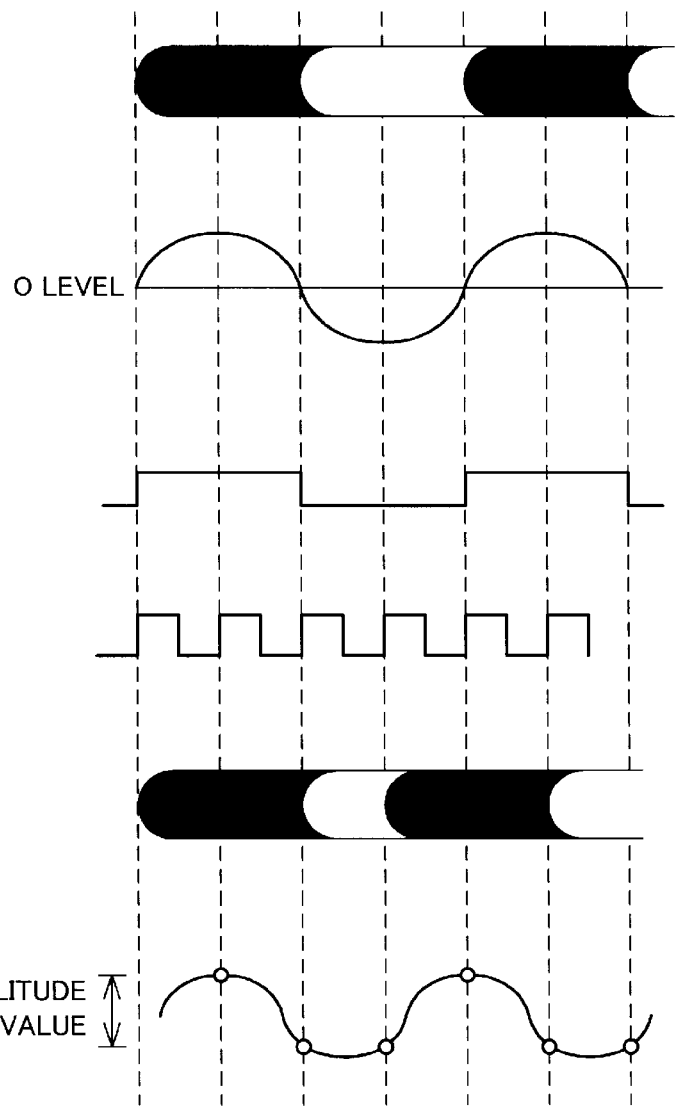
FIG. 4 is an explanatory view illustrating a clock extracted from a reproducing signal of the phase adjusting pattern shown in FIG. 3(a).
Figure 6:
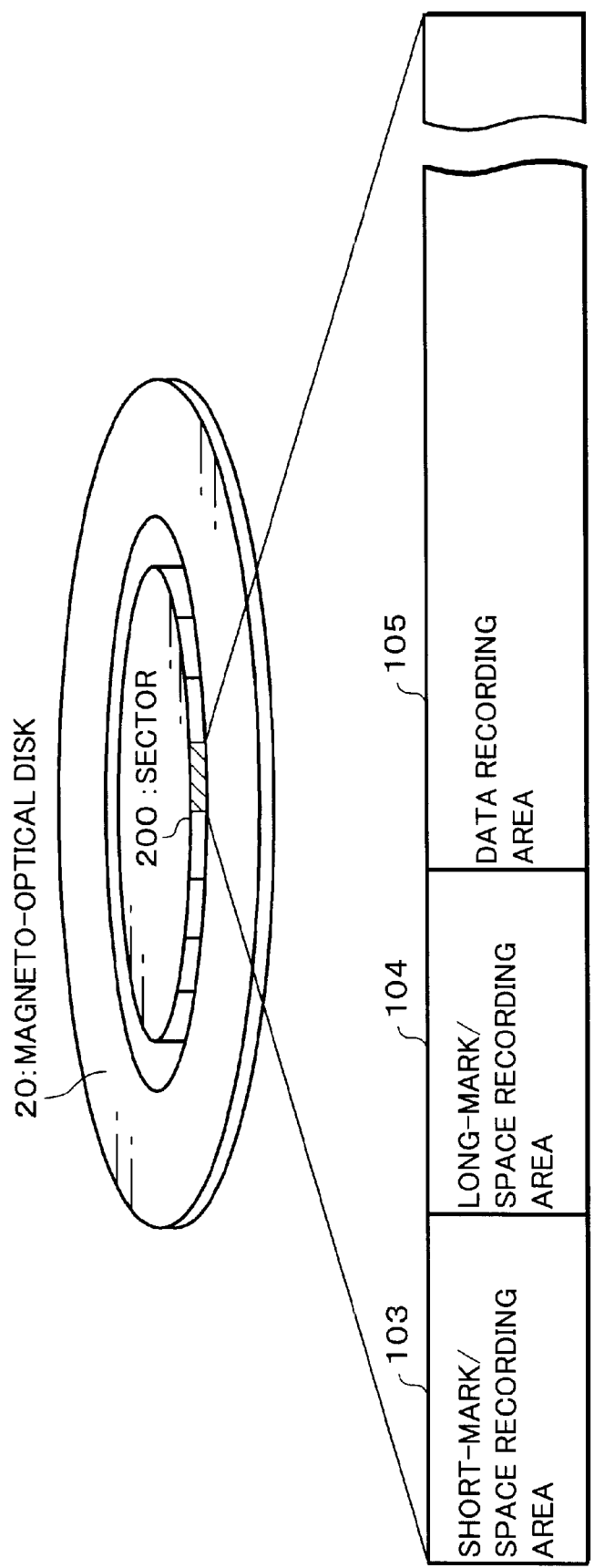
FIG. 6 is a view schematically explaining a sector structure in the magneto-optical disk shown in FIG. 5.
Figure 7A:
FIG. 7(a) is an explanatory view illustrating a short-mark/space pattern recorded in the short-mark/space recording area of the sector shown in FIG. 6.
Figure 7B:
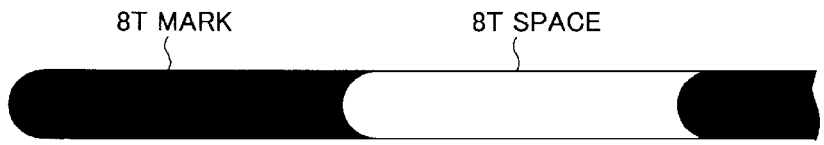
FIG. 7(b) is an explanatory view illustrating a long-mark/space pattern recorded in the long-mark/space recording area in the sector shown in FIG. 6.
Figure 8:
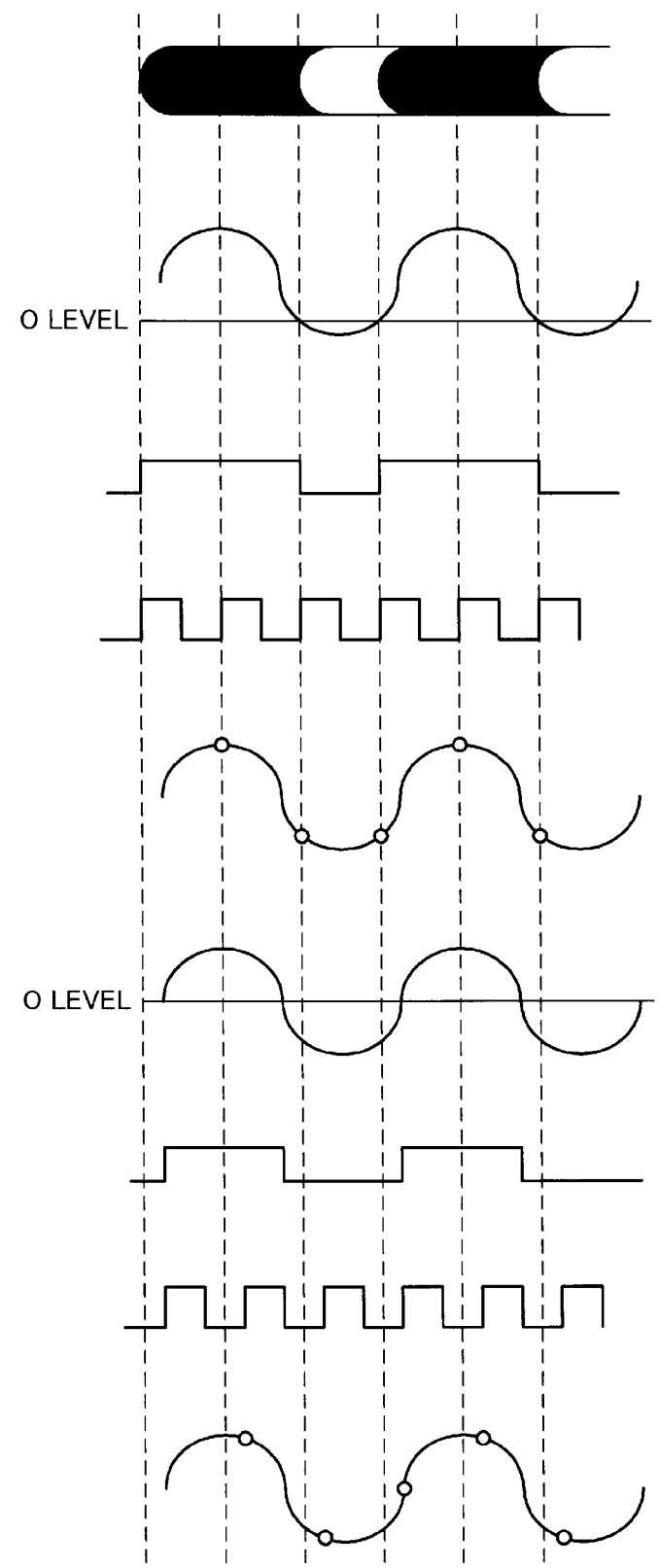
FIG. 8 is an explanatory view showing a clock extracted from a reproducing signal of the short-mark/space pattern shown in FIG. 7(a).

The following description will explain a reproducing operation with respect to the magneto-optical disk 1 thus recorded, while referring to FIGS. 1 and 4. Note that FIG. 4 is an explanatory view illustrating a clock extracted from the reproducing signal of the phase adjusting pattern.

When the emitted light from the semiconductor laser 2 is projected on the phase adjusting pattern recording area 101 of the sector 100 on the magneto-optical disk 1, reflected light from the phase adjusting pattern recorded in this area (see FIG. 4(a)) is converted into a reproducing signal by the photo-diode 3.

The reproducing signal is inputted to the reproducing clock extracting/phase-fixing circuit 6 after low-frequency components are removed by the amplifier 4. Incidentally, since the phase adjusting pattern composed of the 2T-long spaces and 2T-long marks does not have low-frequency components, the reproducing signal becomes symmetric vertically with respect to the 0 level, as shown in FIG. 4(b).

In accordance with edges of a signal (FIG. 4(c)) obtained by binarizing the foregoing signal (FIG. 4(b)) at the 0 level, the reproducing clock extracting/phase-fixing circuit 6 extracts a clock having stable and optimal phases (FIG. 4(d)).

Next, upon irradiation of the synchronous pattern recording area 102 by the emitted light, a reproducing signal of the synchronous pattern is inputted via the amplifier 4 to the synchronous pattern detecting circuit 7. The synchronous pattern detecting circuit 7, upon recognizing reproduction of the synchronous pattern, sends a syncronization detecting signal to the reproducing clock extracting/phase-fixing circuit 6 and the short-mark/space amplitude detecting circuit 9.

The reproducing clock extracting/phase-fixing circuit 6, upon receiving the syncronization detecting signal, suspends the clock phase adjustment according to the reproducing signal, and fixes the phase at the moment, that is, the phase obtained by the adjustment according to the phase adjusting pattern. Consequently, a fixed phase clock independent from the reproducing signal (FIG. 4(d) is outputted. By so doing, the phase of the reproducing clock can be adjusted according to only the phase adjusting pattern, thereby enabling output of a clock having stable and optimal phases at any time.

Subsequently, upon irradiation of the short-mark/space recording area 103 by the emitted light, reflected light from the short-mark/space pattern recorded in the region (FIG. 4(e)) is inputted to the A/D converter 5 via the amplifier 4. Here used is the clock (FIG. 4(d)) whose phase is fixed to the phase obtained by adjustment by the clock extracting/phase-fixing circuit 6 according to the phase adjusting pattern. Therefore, the sampling is carried out and the sampled values are subjected to A/D conversion at the timings indicated with ○ in FIG. 4(f), then, inputted to the short-mark/space amplitude detecting circuit 9.

The short-mark/space amplitude detecting circuit 9, in response to the syncronization detecting signal supplied from the synchronous pattern detecting circuit 7, starts averaging the sampled values thus consecutively inputted, so that an amplitude value is determined based on the reproducing signals from the entirety of the short-mark/space pattern.

Subsequently, the long-mark/space pattern recorded in the long-mark/space recording area 104 is made to pass through the photo-diode 3, the amplifier 4, the A/D converter 5, and the long-mark/space amplitude detecting circuit 8 in the stated order, whereby an amplitude value of the long-mark/space pattern is detected.

A detected amplitude ratio is determined by the division circuit 11 based on the amplitude value of long-mark/space pattern and the amplitude value of the short-mark/space pattern previously detected. Then, the detected amplitude ratio is compared with the standard amplitude ratio by the differential amplifier 12, and the laser power control circuit 13 controls the driving current for the semiconductor laser 2 based on the comparison result.

After the driving current for the laser light is controlled so that an optimum reproducing power should be always stably applied, the emitted light is projected onto the data recording area 105. Reflected light is passed through the photo-diode 3, the amplifier 4, the A/D converter 5, and the reproducing data processing circuit 10, whereby reproduced information data are outputted at a low error rate.

As described above, the recording-reproducing device of the present embodiment is arranged so as to record a phase adjusting pattern by the same method as the information data recording method (herein the magneto-optical recording method), and to adjust the phase of the reproducing clock by using the recorded phase adjusting pattern. Therefore, the sampling of the reproducing signal of the short-mark/space pattern and the determination of the amplitude value thereof can be at any time carried out according to the stable phase, thereby allowing the reproducing power control to be stably carried out.

Furthermore, a pattern whose mark and space differ in length is adopted as the reproducing-power-control pattern, while a pattern whose mark and space have the same length is adopted as the phase adjusting pattern. By so doing, the optimal patterns suitable to the respective objects are obtained thereby realizing the precise phase adjustment and the precise reproducing power control.

Furthermore, since synchronization is carried out in the front part of the short-mark/space recording area, all the reproducing signals from the short-mark/space pattern recorded in the area can be used for the amplitude value calculation, thereby enabling to determine an amplitude value with less error.

Incidentally, a pattern in which the 1T-long and 2T-long marks and spaces are mixed is used as the short-mark/space pattern in the present embodiment. This is because in the case of 1T (T represents the minimum recording length), the S/N ratio becomes too low since a signal obtained therefrom has a small amplitude value. On the other hand, in the case of 2T, sensitivity to changes in the amplitude ratio cannot be obtained at a level sufficient to detect an optimum aperture since a signal obtained therefrom has a great amplitude value. Besides, a pattern composed of a mark and a space that are both 2T-long is used as the phase adjusting pattern. This is because an amplitude obtained from that with the length of 1T is too small to allow stable phase adjustment be conducted, whereas, in the case where that is too long (>3T), the recording area has to be provided longer so that the number of rising (falling) parts of a signal is sufficient for phase adjustment.

The respective optimal patterns suitable for the reproducing power control and the phase adjustment, however, change depending on the characteristics of the optical memory medium and the characteristics of the optical head. The phase adjusting pattern and the reproducing control pattern of the present invention therefore are not limited to those used in the foregoing embodiment. In other words, the essence of the present invention is to provide more precis e reproducing power control by detecting an amplitude of the reproducing-power-control pattern based on the precisely adjusted clock phase.

Furthermore, the foregoing description has been given by way of example with reference to the embodiment in which the phase adjusting pattern, the short-mark/space pattern, and the long-mark/space pattern are recorded in the header, but the present invention is not limited to this. An arrangement in which they are recorded in other areas than the header may be applied. However, since the phase adjusting pattern is to adjust the phase of the reproducing clock, it is most preferably recorded in the header, while the short-mark/space pattern is preferably recorded in the vicinity of the phase adjusting pattern so as not to be affected by phase changes.

On the other hand, the amplitude value of the reproducing signal of the long-mark/space pattern is hardly affected by changes of the sampling phase. For this reason, the long-mark/space pattern is not necessarily recorded in the vicinity of the phase adjusting pattern. The phase adjusting pattern and the short-mark/space pattern may be recorded in the header, and the long-mark/space pattern may be provided in other areas, such as RESYNC patterns that are dispersedly disposed in the data recording area for re-synchronization to adjust sampling timings.

Incidentally, in the case where the short-mark/space pattern and the long-mark/space pattern are separately provided in one sector, the following method is applicable: when reproduction of a sector is executed, an amplitude ratio of reproducing signals from a short-mark/space pattern and a long-mark/space pattern is determined, and the reproducing power of the semiconductor laser for the next sector is controlled based on the amplitude ratio determined.

Furthermore, in the foregoing embodiment, the clock phase adjustment is carried out during reproduction of the phase adjusting pattern, and the phase is fixed upon detection of the synchronous pattern, then the reproduction of the short-mark/space pattern is reproduced at the foregoing phase. The timing for fixing the phase of the clock is not particularly limited to this. Incidentally, the phase of the clock upon reproduction of the data recording area or the long-mark/space pattern next to the short-mark/space pattern may be the foregoing fixed phase, or may be a phase obtained by adjustment according to respective reproducing signals.

Furthermore, the foregoing description has been given by way of example with reference to the embodiment in which two types of patterns, i.e., the short-mark/space and the long-mark/space are used, but the present invention is not limited to this. In other words, the essence of the present invention is that, in the case where a pattern whose mark and space are different in length is used for the reproducing power control, the phase adjusting pattern whose mark and space are equal to each other in length is discretely provided. Therefore, needless to say, in the case where the reproducing power control is carried out using only the short-mark/space whose mark and space are different in length, the present invention is effective as well.

As described above, a first optical recording device of the present invention is an optical recording device for recording information in an optical memory medium that is information-rewritable, and the device is characterized by including (1) first pattern generating means for generating a signal corresponding to a power control pattern for control of a reproducing power of a light beam, (2) second pattern generating means for generating a signal corresponding to a phase adjusting pattern for adjusting a phase of a reproducing clock to be used upon reproduction of the power control pattern, and (3) pattern recording means for recording the phase adjusting pattern and the power control pattern in the stated order in each sector of the optical memory medium by switching between an output of the first pattern generating means and an output of the second pattern generating means.

According to the foregoing arrangement, the phase adjusting pattern is recorded in each sector. Therefore, a reproducing signal from the short-mark/space pattern recorded behind the phase adjusting pattern is sampled according to the clock whose phases are precisely adjusted, so that an amplitude value of the reproducing signal can be determined. Consequently, the reproducing power control can be stably carried out at any time.

A second optical recording device of the present invention is the first optical recording device further characterized in that (1) the first pattern generating means generates a signal corresponding to the power control pattern whose mark and space differ in length, and (2) the second pattern generating means generates a signal corresponding to the phase adjusting pattern whose mark and space are equal in length.

According to the foregoing arrangement, the phase adjusting pattern whose mark and space are equal to each other in length and the power control pattern whose mark and space differ in length are recorded in each sector. With this arrangement, it is possible to determine an amplitude value of the power control pattern according to the clock having stable phases during reproducing. Consequently, information data can be reproduced with a precise and optimum reproducing power at any time.

A third optical recording device of the present invention is the first optical recording device further characterized by including third pattern generating means for generating a synchronous pattern that is different from both the phase adjusting pattern and the power control pattern, wherein the pattern recording means records the synchronous pattern immediately before the power control pattern, by applying an output of the third pattern generating means before applying the output of the first pattern generating means.

According to the foregoing arrangement, the synchronous pattern that is different from both the phase adjusting pattern and the power control pattern is recorded immediately before the power control pattern. Therefore, the sampling of the power control pattern can be started in response to detection of the synchronous pattern during reproducing. This enables to surely detect an amplitude value of the power control pattern.

A first optical reproducing device of the present invention is an optical reproducing device for reproducing an optical memory medium in which recorded are a power control pattern for controlling a reproducing power of a light beam and a phase adjusting pattern for adjusting a phase of a reproducing clock to be used upon reproduction of the power control pattern, and the device is characterized by including (1) phase adjusting means for adjusting the phase of the reproducing clock according to the phase adjusting pattern, (2) A/D converting means for, at the timing of the output of the phase adjusting means, carrying out A/D conversion of a reproducing signal of the power control pattern, (3) amplitude detecting means for, from an output of the A/D converting means, detecting an amplitude value of the reproducing signal of the power control pattern, and (4) power control means for controlling a reproducing power according to the amplitude detected by the amplitude detecting means.

A second optical reproducing device of the present invention is the first optical reproducing device further characterized in that (1) the phase adjusting means adjusts the phase of the reproducing clock according to the power control pattern whose mark and space are equal in length, and (2) the A/D converting means carries out A/D conversion of the reproducing signal whose mark and space differ in length.

A third optical reproducing device of the present invention is an optical reproducing device for reproducing an optical memory medium in which recorded are a power control pattern for controlling a reproducing power of a light beam, a phase adjusting pattern for adjusting a phase of a reproducing clock to be used upon reproduction of the power control pattern, and a synchronous pattern that is provided immediately before the power control pattern and that is different from both the phase adjusting pattern and the power control pattern, and the device is characterized by including (1) phase adjusting means for adjusting the phase of the reproducing clock according to the phase adjusting pattern, (2) synchronization detecting means for detecting the synchronous pattern, (3) A/D converting means for, at the timing of the output of the phase adjusting means, carrying out A/D conversion of a reproducing signal of the power control pattern, and (4) amplitude detecting means for starting to detect an amplitude value of the reproducing signal of the power control pattern from the output of the A/D converting means, according to the detection of the synchronous pattern by the synchronization detecting means.

A first optical memory medium is characterized by having sectors each of which includes (1) a power control pattern recording area for recording a power control pattern for controlling a reproducing power of a light beams, and (2) a phase adjusting pattern recording area for recording a phase adjusting pattern for adjusting a phase of a reproducing clock to be used upon reproduction of the power control pattern, the phase adjusting pattern recording area being provided before the power control pattern recording area.

A second optical memory medium of the present invention is the first optical memory medium further characterized in that (1) a pattern whose mark and space differ in length is recorded as the power control pattern, and (2) a pattern whose mark and space are equal in length is recorded as the phase adjusting pattern.

A third optical memory medium of the present invention is the first optical memory medium further characterized in that the power control pattern recording area and the phase adjusting pattern recording area are provided in a header in a front part of each sector.

The foregoing arrangement in which the phase adjusting pattern and the power control pattern are recorded in a front part (header) of each sector enables stable adjustment of the phases of the reproducing clock and stable reading of an amplitude from the power control pattern.

A fourth optical memory medium of the present invention is any one of the first through third optical memory media further characterized in that the each sector further includes a synchronous pattern recording area immediately before the power control pattern, the synchronous pattern being different from both the power control pattern and the phase adjusting pattern.

According to the foregoing arrangement, the synchronous pattern that is different from both the phase adjusting pattern and the power control pattern is recorded immediately before the power control pattern. With this arrangement, the sampling of the power control pattern can be started in response to detection of the synchronous pattern during reproducing. This enables to surely detect an amplitude value of the power control pattern.

A fifth optical memory medium of the present invention is the fourth optical memory medium further characterized in that the phase adjusting pattern recording area, the synchronous pattern recording area, and the power control pattern recording area are provided continuously in the stated order.

A sixth optical memory of the present invention is the second optical memory medium further characterized in that, letting the shortest recording length be T, (1) the phase adjusting pattern is a pattern composed of 2T-long marks and 2T-long spaces, the 2T-long marks and the 2T-long spaces being alternately provided, and (2) the power control pattern is a pattern composed of 2T-long marks and 1T-long spaces, the marks and the spaces being alternately provided.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An optical recording device for recording information in an optical memory medium, said device comprising:

first pattern generating means for generating a signal corresponding to a power control pattern for control of a reproducing power of a light beam;

second pattern generating means for generating a signal corresponding to a phase adjusting pattern for adjusting a phase of a reproducing clock to be used upon reproduction of the power control pattern; and pattern recording means for recording the phase adjusting pattern and the power control pattern in the stated order in each sector of said optical memory medium by switching between an output of said first pattern generating means and an output of said second pattern generating means.

2. The optical recording device as set forth in claim 1, wherein:

said first pattern generating means generates a signal corresponding to the power control pattern whose mark and space differ in length; and said second pattern generating means generates a signal corresponding to the phase adjusting pattern whose mark and space are equal in length.

3. The optical recording device as set forth in claim 1, further comprising:

third pattern generating means for generating a synchronous pattern that is different from both the phase adjusting pattern and the power control pattern, wherein said pattern recording means records the synchronous pattern immediately before the power control pattern, by applying an output of said third pattern generating means before applying the output of said first pattern generating means.

4. An optical reproducing device for reproducing an optical memory medium in which recorded are a power control pattern for controlling a reproducing power of a light beam and a phase adjusting pattern for adjusting a phase of a reproducing clock to be used upon reproduction of the power control pattern, said device comprising:

phase adjusting means for adjusting the phase of the reproducing clock according to the phase adjusting pattern;

A/D converting means for, at the timing of the output of said phase adjusting means, carrying out A/D conversion of a reproducing signal of the power control pattern;

amplitude detecting means for, from an output of said A/D converting means, detecting an amplitude value of the reproducing signal of the power control pattern; and power control means for controlling a reproducing power according to the amplitude detected by said amplitude detecting means.

5. The optical reproducing device as set forth in claim 4, wherein:

said phase adjusting means adjusts the phase of the reproducing clock from the power control pattern whose mark and space are equal in length; and said A/D converting means carries out A/D conversion of the reproducing signal from the power control pattern whose marks and spaces differ in length.

6. An optical reproducing device for reproducing an optical memory medium in which recorded are a power control pattern for controlling a reproducing power of a light beam, a phase adjusting pattern for adjusting a phase of a reproducing clock to be used upon reproduction of the power control pattern, and a synchronous pattern that is provided immediately before the power control pattern and that is different from both the phase adjusting pattern and the power control pattern, said device comprising:

phase adjusting means for adjusting the phase of the reproducing clock according to the phase adjusting pattern;

synchronization detecting means for detecting the synchronous pattern;

A/D converting means for, at the timing of the output of said phase adjusting means, carrying out A/D conversion of a reproducing signal of the power control pattern; and amplitude detecting means for starting to detect an amplitude value of the reproducing signal of the power control pattern from the output of said A/D converting means, according to the detection of the synchronous pattern by said synchronization detecting means.

7. An optical memory medium having sectors, each sector including:

a power control pattern recording area for recording a power control pattern for controlling a reproducing power of a light beams; and a phase adjusting pattern recording area for recording a phase adjusting pattern for adjusting a phase of a reproducing clock to be used upon reproduction of the power control pattern, said phase adjusting pattern recording area being provided before said power control pattern recording area.

8. The optical memory medium as set forth in claim 7, wherein:

a pattern whose marks and spaces differ in length is recorded as the power control pattern; and a pattern whose marks and spaces are equal in length is recorded as the phase adjusting pattern.

9. The optical memory medium as set forth in claim 7, wherein said power control pattern recording area and said phase adjusting pattern recording area are provided in a header in a front part of each sector.

10. The optical memory medium as set forth in claim 7, wherein said each sector further includes a synchronous pattern recording area immediately before said power control pattern, the synchronous pattern being different from both said power control pattern and said phase adjusting pattern.

11. The optical memory medium as set forth in claim 10, wherein said phase adjusting pattern recording area, said synchronous pattern recording area, and said power control pattern recording area are provided continuously in the stated order.

12. The optical memory medium as set forth in claim 8, wherein, letting the shortest recording length be T:

the phase adjusting pattern is a pattern composed of 2T-long marks and 2T-long spaces, the 2T-long marks and the 2T-long spaces being alternately provided; and the power control pattern is a pattern composed of 2T-long marks and 1T-long spaces, the marks and the spaces being alternately provided.

* * * * *